(12) United States Patent
Jin et al.

(10) Patent No.: US 7,973,103 B2
(45) Date of Patent: Jul. 5, 2011

(54) FUSER ROLLER COMPOSITION

(75) Inventors: Xin Jin, Pittsford, NY (US); Douglas E. Garman, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 1011 days.

(21) Appl. No.: 11/446,894

(22) Filed: Jun. 5, 2006

(65) Prior Publication Data

US 2007/0282048 A1    Dec. 6, 2007

(51) Int. Cl.
*C08G 18/66*    (2006.01)
*C08K 5/07*    (2006.01)
*B32B 27/00*    (2006.01)

(52) U.S. Cl. ........ 524/356; 524/430; 524/502; 524/544; 428/422

(58) Field of Classification Search .................. 524/356, 524/544, 340, 430, 502; 428/422
See application file for complete search history.

(56) References Cited

U.S. PATENT DOCUMENTS

| | | | | |
|---|---|---|---|---|
| 4,489,196 A | * | 12/1984 | Schmiegel | 525/326.3 |
| 4,853,737 A | * | 8/1989 | Hartley et al. | 399/333 |
| 5,017,432 A | * | 5/1991 | Eddy et al. | 428/422 |
| 5,059,580 A | * | 10/1991 | Shibata et al. | 503/227 |
| 5,332,641 A | * | 7/1994 | Finn et al. | 430/124.33 |
| 5,547,759 A | * | 8/1996 | Chen et al. | 428/421 |
| 5,599,631 A | * | 2/1997 | Chen et al. | 428/421 |
| 6,696,158 B1 | | 2/2004 | Chen et al. | |
| 2005/0008805 A1 | * | 1/2005 | Chen et al. | 428/36.8 |

OTHER PUBLICATIONS

P. Venkateswarlu, R.E. Kolb and R.A. Guenther, "Fluorocarbon Elastomer Cure Chemistery: An Investigation of Reactions in Solid Phase", Oct. 17-20, 1989, pp. 360-361.

* cited by examiner

*Primary Examiner* — Ling-Siu Choi
*Assistant Examiner* — Bijan Ahvazi
(74) *Attorney, Agent, or Firm* — Carl F. Ruoff; Andrew J. Anderson

(57) ABSTRACT

The present invention discloses a fuser roller composition that contains a fluorocopolymer, an aliphatic ketone organic solvent, metal oxide particles, and a benzyltriphenylphosphonium phenolate salt curing agent. To this composition is added a sufficient amount of 4,4'-(hexafluoroisopropylidene) diphenol to extend a time at which viscosity of the composition rises above a predetermined level.

7 Claims, No Drawings

FUSER ROLLER COMPOSITION

FIELD OF THE INVENTION

This invention relates to fuser members useful for heat-fixing a heat-softenable toner material to a substrate. More particularly, the invention relates to an improved coating composition for manufacturing fuser members.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid support covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

Particulate inorganic fillers have been added to base cushion layers to improve mechanical strength and thermal conductivity. High thermal conductivity is advantageous when the fuser member is heated by an internal heater, so that the heat can be efficiently and quickly transmitted toward the outer surface of the fuser member and toward the toner on the receiver sheet it is intended to contact and fuse. High thermal conductivity is not so important when the roll is to be heated by an external heat source.

Fluoropolymers are widely used in the form of sheet, film, coatings and laminates in various fields due to their characteristic properties such as good heat resistance, good chemical resistance and good weather resistance. These materials find applications as top-layers on electrophotographic toner fuser rollers or belts to provide appropriate frictional characteristics, abrasion and wear resistance, flexibility, processability, and adhesion to a particular substrate.

Fluoroelastomers are highly fluorinated synthetic polymer with elastic properties when cross-linked. Those materials are extremely stable to oxidative, flame, and chemical attacks. Hence, fluoroelastomers are widely used in many applications, such as aerospace, military and oil well, where a stable elastomer is required for the harsh environment. Fluoroelastomers were first commercialized in the early 1950s and evolved to series of various copolymer systems. The terpolymers of vinylidene fluoride ($VF_2$), hexafluoropropylene (HFP) and tetrafluoroethylene (TFE) were developed and commercialized first as Viton B by Du Pont in the 1960s. Fluoropolymers need crosslinking or curing process to become elastomers and the curing is about the most critical aspect to provide the superior elastic properties. There are several curing systems developed for fluoroelastomers, such as radiation, peroxide, dithiol, diamine and aromatic hydroxy compounds.

Amine and amine derivatives used to be the most common curatives for the fluoropolymer materials. Metal oxide was always used together with amines for the curing process. It was reported that fluoropolymers are cured by amines in a three-step process. The first step is the elimination of hydrogen fluoride by bases to form double bonds. The second step involves nucleophilic addition of amines to the double bonds and the last step is the elimination of hydrogen fluoride again to form imines in the crosslinking structures. However, it was found that amines and polyamines, especially those aliphatic compounds, are too reactive for the curing process. In addition, the formed imine structures are vulnerable to different kinds of cleavage reactions. Due to those deficiencies the use of amine curatives becomes less and less popular. Instead a type of aromatic hydroxy compound curatives was developed and widely used curing agents for the fluoroelastomer applications. The commonly used aromatic hydroxy compound for the fluoroelastomer curing process is 4,4'-(hexafluoroisopropylidene)diphenol (bisphenol AF). One common curing agent conjunction with bisphenol AF is Curative 50™ from Du Pont, which is claimed to be a mixture of bisphenol AF and benzyltriphenylphosphonium salt complex.

The crosslinking mechanism of fluoroelastomer by bisphenol AF was reported to go through fluoride elimination and nucleophilic addition steps as well (P. K. Venkateswarlu, R. E.; Guenthner, R. A., *Polymer Preprints* 31 (1), 360 (1990)). However, unlike amine compounds, bisphenol AF alone is hardly active toward either elimination or nucleophilic addition reaction. The real active species in the crosslinking reaction is claimed to be the bisphenol AF phosphonium salt, which is a critical intermediate generated by the phosphonium component in the mixture.

U.S. Pat. No. 6,696,158 discloses a fuser member having a support and overlaid on the support a layer including a fluorocarbon thermoplastic random copolymer, a curing agent, a particulate filler containing zinc oxide, and an aminosiloxane. The fuser member disclosed in this patent has improved toner release and mechanical strength.

However, the coating composition used to manufacture the fuser member in U.S. Pat. No. 6,696,158 has a limited lifetime.

SUMMARY OF THE INVENTION

The present invention discloses a fuser roller composition that contains a fluorocopolymer, an aliphatic ketone organic solvent, metal oxide particles, and a benzyltriphenylphosphonium phenolate salt curing agent. To this composition is added a sufficient amount of 4,4'-(hexafluoroisopropylidene) diphenol to extend a time at which viscosity of the composition rises above a predetermined level.

DETAILED DESCRIPTION OF THE INVENTION

The present invention is a solution for undesirably short coating fluid lifetime experienced during the fuser roller manufacturing process. This invention describes the addition of 4,4'-(hexafluoroisopropylidene) diphenol (bisphenol AF) into the fluoropolymer latex coating mixture used to coat fuser rollers. It has been found that bisphenol AF can increase the useful lifetime of the coating composition. It is theorized that the lifetime of the coating composition is extended by retarding the gelation reaction of the fluoropolymer latex coating solution, so better control of the roller coating process is achieved. In addition, the bisphenol AF can help to provide the degree of crosslinking of the fluoropolymer latex coating upon curing. Both improvements are crucial for the manufacturing of fluoropolymer latex coating over coated fusing rollers.

The fluoropolymer latex coating includes the following subunits of:

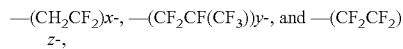
—$(CH_2CF_2)x$-, —$(CF_2CF(CF_3))y$-, and —$(CF_2CF_2)z$-, wherein:
x is from 1 to 40 or 60 to 80 mole percent,
z is greater than 40 to no more than 89 mole percent, and is such that x+y+z equals 100 mole percent;
—$(CH_2CF_2)$ referred to as (vinylidene fluoride subunit ("$VF_2$")),
—$(CF_2CF(CF_3))$ referred to as (hexefluoropropylene subunit ("HFP")), and
—$(CF_2CF_2)$ referred to as (tetrafluoroethylene subunit ("TFE")).

The fluoropolymer latex coating formulation may also include the subunits of aminosiloxane. The aminosiloxane compound is an amino functional polydimethyl siloxane copolymer comprising aminofunctional units selected from (aminoethylaminopropyl) methyl, (aminopropyl) methyl and (aminopropyl) dimethyl.

Optionally, the layer may further contain fluorinated particles; the fluorinated particles are made of poly(hexefluoropropylene-tetrafluoroethylene) (FEP) or poly(tetrafluoroethylene) (PTFE) with a number average molecular weight of about 50,000 to 50,000,000.

The other components of the fluoropolymer latex coating include metal oxide, ketone organic solvent such as methyl ethyl ketone, and a benzyltriphenylphosphonium phenolate salt containing some bisphenol residue as curing agent, e.g. Curative 50.

The curing process of fluoropolymer latex coating involves dehydrofluorination/defluorination of the fluoropolymer backbone, followed by nucleophilic addition of aminosiloxane and bisphenol residue. The present invention provides that both the lifetime of the fluoropolymer latex coating mixture and the final crosslinking degree after curing are improved.

The present invention theorizes that the Curative 50 contains benzyltriphenylphosphonium phenolate salt, a critical intermediate for the curing process. The crosslinking reaction by benzyltriphenylphosphonium phenolate salt is a quasi-stepwise reaction, because of the big difference between the pKa values of two protons in bisphenol AF.

It is believed that the following is occurring, although applicants do not wish to be bound by this theory. The first step involves the attachment of one functional group of bisphenol AF to the fluoropolymer backbone. The second step is the real crosslinking reaction by the phosphonium complex of pendent bisphenol AF with the active site of the fluoropolymer backbone. If one extends the reaction time of the first step reaction while maintaining or accelerating the second step reaction, the useful lifetime of the fluoropolymer latex coating fluid will become longer and the crosslinking degree of the cured films will increase as well. The crosslinking reaction by bisphenol AF and benzyltriphenylphosphonium phenolate salt is a quasi-stepwise reaction, which is due to the big pKa difference for the two protons in bisphenol AF. Venkateswarlu, et al, reported that the pKa1 and pKa2 of bisphenol AF are 8.6 and 10.2, respectively, which indicates one proton is about 40 times more reactive than the other one.

The higher the amount of bisphenol AF, the longer the time required to consume bisphenol AF and complete the monofunctional attachment on fluoropolymer backbone. During this first step reaction, the second step of crosslinking reaction is unlikely to occur due to the pKa difference, so the fluoropolymer latex coating mixture can maintain a relatively constant viscosity during the time period of the monofunctional reaction. Immediately after the finish of the first step of the reaction, the regenerated phosphonium salts start to form a complex with the pendent bisphenol AF, which is the real reaction intermediate for the crosslinking reaction of fluoropolymer by Curative 50. Because the higher amount of bisphenol AF generates more pendent bisphenol AF groups, the system with more bisphenol AF yields a higher degree of crosslinking.

Curing of the fluoropolymer latex materials is carried out at 50 to 290° C. for 12-48 hours. Thermal decomposition experiments indicated that both Curative 50 and bisphenol AF decompose and/or evaporate quickly at temperatures higher than 200° C. and those side reactions compete with the expected crosslinking reactions during the fluoropolymer latex curing process. To make the curing process favor the real crosslinking reaction of fluoropolymer rather than decomposition, an effective curing program should extend the efficient curing time period at temperature lower than the 200° C. The combination of higher amount bisphenol AF and extended time period at a curing temperature below the decomposition limit not only increases the pot life of the fluoropolymer latex coating fluid but also improves the crosslinking density of the cured fluoropolymer films.

TanDelta, the ratio between loss and storage modulus, is commonly used to characterize the crosslinking degrees of many polymer systems. The lower the tanDelta, the higher crosslinking degrees of cured polymer network. It is established that tanDelta values are able to characterize the crosslinking degrees of fluoropolymer latex coating. The viscosity of the fluoropolymer latex coating fluid is a sensitive indicator of the life time of the coating solution. Due to reactions among the fluoropolymer and curing agents, the viscosity of the fluoropolymer coating mixture may increase slowly at the beginning; however, the viscosity increase starts to accelerate during a certain time period. The pot life of the fluoropolymer latex coating fluid may be empirically defined as the time required for the viscosity of the fluid to be quadrupled, around which the increase of fluid viscosity starts to accelerate. The fluoropolymer latex fluid beyond its pot life is difficult to coat by either transfer coating or hand knife coating processes and approaches its gelation point quickly, at which point the fluoropolymer coating fluid becomes a soft gel and cannot be coated by any process.

The fuser member is constructed forming a toner release layer on an optional base cushion provided on a support comprising the steps of:
(a) providing a support;
(b) providing a mixture having:
 (i) a fluorolatex thermoplastic polymer
 (ii) a filler comprising zinc oxide;
 (iii) a curable amino functional polydimethyl siloxane copolymer comprising aminofunctional units selected from the group consisting of (aminoethylaminopropyl) methyl, (aminopropyl)methyl and aminopropyl) dimethyl.
 (iv) a bisphenol residue curing agent; and
(c) applying the mixture to the base cushion and curing the applied mixture to crosslink the fluorocarbon thermoplastic random copolymer.

In cases where it is intended that the fuser member be heated by an internal heater, it is desirable that the outer layer have a relatively high thermal conductivity, so that the heat can be efficiently and quickly transmitted toward the outer surface of the fuser member that will contact the toner to be fused. Depending upon relative thickness, it is generally even more desirable that the base cushion layer and any other intervening layers have a relatively high thermal conductivity. Suitable materials for the base cushion layer are discussed below.

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane, amino functionalized polydimethylsiloxane or mercapto functionalized polydimethylsiloxane release oils at normally used application rates or at reduced application rates.

The outer layer of the fuser member of the invention is substantially resistant to release oil induced swelling. In a preferred embodiment of the invention, the change in size due to swelling is less than 0.1 to 1.0 percent. In an even more preferred embodiment of the invention, the change in size due to swelling is less than 0.01 to 0.1 percent.

The thickness of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.6 to 5.0 mm have been found to be appropriate for various applications. In some embodiments of the present invention, the base cushion layer is about 2.5 mm thick, and the outer layer is from about 25 to 150 micrometers thick.

Suitable materials for the base cushion layer include any of a wide variety of materials previously used for base cushion layers, such as the condensation cured polydimethylsiloxane marketed as EC4952 by Emerson Cuming. An example of a condensation cured silicon rubber base cushion layer is GE 4044 marketed by General Electric of Waterford, N.Y. An example of an addition cured silicone rubber is Silastic J RTV marketed by Dow Coming applied over a silane primer DC-1200 also marketed by Dow Coming.

In a particular embodiment of the invention, the base cushion is resistant to cyclic stress induced deformation and hardening. Examples of suitable materials to reduce cyclic stress induced deformation and hardening are filled condensation-crosslinked PDMS elastomers disclosed in U.S. Pat. No. 5,269,740, entitled "Fuser Roll for Fixing Toner to a Substrate", U.S. Pat. No. 5,292,606, entitled "Fuser Roll for Fixing Toner to a Substrate", U.S. Pat. No. 5,292,562, entitled "Fuser Roll for Fixing Toner to a Substrate", U.S. Pat. No. 5,480,724, entitled "Fuser Roll for Fixing Toner to a Substrate Comprising Tin Oxide Fillers", U.S. Pat. No. 5,336,539, entitled "Fuser Roll Containing Nickel Oxide Particles for Fixing Toner to a Substrate, entitled". These materials all show reasonable thermal conductivities and much less change in hardness and creep than EC4952 or the PDMS elastomer with aluminum oxide filler. Additional suitable base cushions are disclosed in U.S. Pat. No. 5,466,533, entitled "Zinc Oxide Filled Diphenylsiloxane-Dimethylsiloxane Fuser Roll for Fixing Toner to a Substrate", U.S. Pat. No. 5,474,852, entitled "Tin Oxide Filled Diphenylsiloxane-Dimethylsiloxane Fuser Roll for Fixing Toner to a Substrate", U.S. Pat. No. 5,464,703, entitled "Tin Oxide Filled Dimethylsiloxane-Fluoroalkylsiloxane Fuser Roll for Fixing Toner to a Substrate". The patents and patent applications mentioned in this paragraph are hereby incorporated herein by reference.

The support of the fuser member is usually cylindrical in shape. It comprises any rigid metal or plastic substance. Metals are preferred when the fuser member is to be internally heated, because of their generally higher thermal conductivity. Suitable support materials include, e.g., aluminum, steel, various alloys, and polymeric materials such as thermoset resins, with or without fiber reinforcement. The support which has been conversion coated and primed with metal alkoxide primer in accordance with U.S. Pat. No. 5,474,821 is hereby incorporated by reference.

The fuser member is mainly described herein in terms of embodiments in which the fuser member is a fuser roll having a support, a base cushion layer overlying the support, and an outer layer superimposed on the base cushion. The invention is not, however, limited to a roll, nor is the invention limited to a fusing member having a support bearing two layers: the base cushion layer and the outer layer. The fuser member can have a variety of outer configurations and layer arrangements known to those skilled in the art. For example, the base cushion layer could be eliminated or the outer layer described herein could be overlaid by one or more additional layers.

The Examples and Comparative Examples are presented to illustrate various embodiments of the invention, and should not be construed as limiting the scope of the present invention. All parts and percentages are by weight, and temperatures in degrees Celsius, unless otherwise indicated. The viscosity of the fluoropolymer latex coating fluid was monitored by a Haake RS-150H Rheometer at room temperature. The mechanical properties of cured fluoropolymer coatings, including tandelta values, were measured by a Rheometrics RSA II Dynamic Mechanical Analyzer (DMA). All chemicals in the examples discussed herein below, except where the preparation thereof is specifically described, are used directly as obtained without purification.

EXAMPLES

Example 1

A mixture of 7.9 grams of copolymer of $VF_2$, HFP and TFE (Whitford Corporation), 0.6 grams of aminosiloxane (Whitford Corporation), 0.9 grams of FEP particles (Whitford Corporation), 0.6 grams of zinc oxide (Atlantic Equipment Engineers) and 90 grams of MEK (Ashland Chemical Company) was roll-milled for 3 days. To the mixture 0.16 grams of Curative 50 (2 weight percents of fluoropolymer) and 0.24 grams of bisphenol AF (3 percents of fluoropolymer) were added and stirred for 10 minutes. The viscosity of the mixture was monitored by Rheometer. The pot life of the mixture, during which the viscosity reached quadruple value of original mixture, was determined to be 14.5 hours.

Example 2

The procedure of Example 1 is substantially repeated, except the amount of bisphenol AF addition was 0.16 grams (2 weight percents of fluoropolymer). The pot life of the mixture was 11.4 hours. Example 3.

The procedure of Example 1 is substantially repeated, except the amount of bisphenol AF addition was 0.8 grams (1 weight percents of fluoropolymer). The pot life of the mixture was 10.5 hours.

Comparative Example 1

The procedure of Example 1 is substantially repeated, except no bisphenol AF is added to the fluoropolymer coating fluid The pot life of the mixture was measured to be 10 hours.

The example results indicate bisphenol AF addition is able to increase the pot life of fluoropolymer latex coating fluid and the higher amount of bisphenol AF addition, the longer the pot life of the coating fluid. In addition, the addition of bisphenol AF also makes the viscosity-temperature relation curve flatter during the pot life period and provides more stable coating process of the fluoropolymer latex fluid.

Example 4

A mixture of 7.9 grams of copolymer of $VF_2$, HFP and TFE (Whitford Corporation), 0.6 grams of aminosiloxane (Whitford Corporation), 0.9 grams of FEP particles (Whitford Corporation), 0.6 grams of zinc oxide (Atlantic Equipment Engineers) and 90 grams of MEK (Ashland Chemical Company) was roll-milled for 3 days. To the mixture 0.12 gram of Curative 50 (1.5 weight percents of fluoropolymer) and 0.16 grams of bisphenol AF (2 percents of fluoropolymer) were added and stirred for 10 minutes. The mixture was coated on a cured silicon rubber base cushion roller by transfer coating process. The thickness of fluoropolymer coating was aimed to 80-100 micron upon curing. The coated roller was then cured at 120° C. for 11 hours, followed by ramp heating to 275° C. for 5 hours. The cured fluoropolymer coating was then carefully removed from the base cushion and analyzed by DMA for the mechanical properties. The tanDelta of the cured coating was 0.08 at 200 degrees Celsius and other mechanical properties, e.g. modulus and elongation, were the same or even superior than those control films without bisphenol AF addition.

Example 5

The procedure of Example 4 is substantially repeated, except the amount of bisphenol AF addition was 0.4 grams (0.5 weight percents of fluoropolymer). The tanDelta of the cured coating was 0.12 at 200° C. and other mechanical properties, e.g. modulus and elongation, were the same or even superior than those control films without bisphenol AF addition.

Comparative Example 2

The procedure of Example 4 is substantially repeated, except no bisphenol AF is added to the fluoropolymer coating fluid The tanDelta of the cured coating was 0.13 at 200 degrees.

Example 4, 5 and Comparative Example 2 demonstrate that addition of bisphenol AF increases the crosslinking degree of the cured fluoropolymer coating effectively as the tanDelta of cured coatings with bisphenol AF addition are significantly lower than the cured control coating without bisphenol AF. The higher the amount of bisphenol AF addition, the lower the tanDelta and the higher the crosslinking density of the fluoropolymer coatings.

The invention has been described in detail with particular reference to certain preferred embodiments thereof, but it will be understood that variations and modifications can be effected within the spirit and scope of the invention.

It is claimed:

1. A fuser roller coating composition comprising:
   a fluorocopolymer;
   an aliphatic ketone organic solvent;
   metal oxide particles;
   a curing agent comprising a benzyltriphenylphosphonium phenolate salt and an amount of bisphenol residue; and
   a sufficient amount of 4,4'-(hexafluoroisopropylidene) diphenol added in addition to the bisphenol residue in the curing agent to extend the time at which viscosity of the composition quadruples.

2. The composition of claim 1 further comprising filler particles.

3. The composition of claim 2 wherein the filler particles comprise poly(hexafluoropropylene-tetrafluoroethylene) or poly(tetrafluoroethylene).

4. The composition of claim 1 further comprising an amino functional polydimethyl siloxane copolymer.

5. The composition of claim 4 wherein the amino functional polydimethyl siloxane copolymer comprises amino functional units selected from the group consisting of (aminoethylaminopropyl)methyl, (aminopropyl)methyl and (aminopropyl)dimethyl.

6. The composition of claim 1 wherein the fluorocopolymer comprises a copolymer having subunits of:

—$(CH_2CF_2)x$-, —$(CF_2CF(CF_3))y$-, and —$(CF_2CF_2)z$-, wherein x is from 1 to 40 or 60 to 80 mole percent, z is greater than 40 to no more than 89 mole percent, and y is such that x+y+z equals 100 mole percent.

7. A fuser roller coating composition comprising:

a fluorocopolymer;

an aliphatic ketone organic solvent;

metal oxide particles;

a curing agent comprising a benzyltriphenylphosphonium phenolate salt and an amount of bisphenol residue; and a sufficient amount of 4,4'-(hexafluoroisopropylidene) diphenol added in addition to the bisphenol residue in the curing agent to extend the time at which the composition reaches its gelation point.

* * * * *